United States Patent [19]

Puffr et al.

[11] 4,111,869
[45] Sep. 5, 1978

[54] METHOD FOR THE POLYMERIZATION OF LACTAMS

[75] Inventors: Rudolf Puffr; Jan Sebenda, both of Prague, Czechoslovakia

[73] Assignee: Ceskoslovenska akademie ved, Prague, Czechoslovakia

[21] Appl. No.: 778,003

[22] Filed: Mar. 16, 1977

Related U.S. Application Data

[63] Continuation-in-part of Ser. No. 551,515, Feb. 21, 1975, abandoned.

[30] Foreign Application Priority Data

Feb. 28, 1974 [CS] Czechoslovakia ............... 1749/74

[51] Int. Cl.$^2$ ............................................. C08G 69/20
[52] U.S. Cl. ........................... 260/18 N; 260/45.75 R; 260/45.75 C; 260/45.75 N; 260/45.75 B; 260/45.75 F; 260/45.75 G; 260/45.75 M; 260/45.75 P; 260/45.75 W; 260/37 N; 528/313; 528/318; 528/319; 260/259.3 R; 260/326.5 FL; 260/326.5 FN; 528/320; 528/312; 528/323; 528/325; 528/326
[58] Field of Search ............ 260/78 L, 78 P, 239.3 A, 260/239.3 R, 18 N

[56] References Cited

U.S. PATENT DOCUMENTS

| | | | |
|---|---|---|---|
| 2,960,489 | 11/1960 | Gabler et al. | 260/78 L |
| 3,017,393 | 1/1962 | Mottus et al. | 260/78 L |
| 3,066,034 | 11/1962 | Temin | 260/45.75 V |
| 3,425,986 | 2/1969 | Mackert | 260/78 L |
| 3,489,726 | 1/1970 | Bukac et al. | 260/78 L |
| 3,491,042 | 1/1970 | Hermann | 260/45.75 W |
| 3,498,956 | 3/1970 | Birkner | 260/78 L |
| 3,631,006 | 12/1971 | Hawkins | 260/78 L |
| 3,673,161 | 6/1972 | Sebenda et al. | 260/78 L |
| 3,705,134 | 12/1972 | James | 260/78 L |
| 3,740,379 | 6/1973 | Sebenda et al. | 260/78 L |
| 3,772,253 | 11/1973 | Brassat | 260/78 L |
| 3,823,105 | 7/1974 | Morival et al. | 260/78 L |

OTHER PUBLICATIONS

Angew, Chim., 80, Jahrg, 1968, No. 6, pp. 243-246.
Die Makromolekulare Chemie, 105, (1967), pp. 261-276, (No. 2261).
Journal of Polymer Science, vol. 31, (1958), pp. 383-397, Majury.
Journal of Polymer Science, vol. 35, (1959), pp. 119-138, Van der Want et al.

*Primary Examiner*—Harold D. Anderson
*Attorney, Agent, or Firm*—Burgess, Ryan and Wayne

[57] ABSTRACT

The invention relates to a method for the cationic polymerization of lactams either substituted or unsubstituted on the lactam ring, which contain 6-16 carbon atoms, in the presence of 0.05 - 10 mol. % based on the lactam of an anhydrous salt of Cu, Zn, B, Al, Ti, Si, V, Sb, Bi, Cr, Mo, W, Mn, Fe, Co, Ni and an inorganic or organic anion such as phosphate, pyrophosphate, phosphite, sulfate, halide, carboxylate and sulfonate in the presence of 0.05 - 5 mol. % of a protic organic or inorganic acid such as pyrophosphoric, phosphorous, hydrohalic carboxylic and sulfonic. These additives can be added to lactam below 180° C and the polymerization is carried out at 150° - 320° C for 0.1 - 200 hr. The above-specified salts, also their mixtures, can be used. The polymerization can be carried out with mixtures containing two or more lactams. The process can be carried out in a solvent and in the presence of various anhydrous inorganic fillers, such as glass fibers, ground minerals, powdered metals, metal oxides, phosphates, sulfates or sulfides or graphite. The process can also be effectively conducted in the presence of organic dyes, plasticizers and emulsifiers. If the polymerization is performed with the salts of cations which are spontaneously reduced by the lactam during polymerization, finely dispersed metals are formed and remain suspended in the polymer.

7 Claims, 1 Drawing Figure

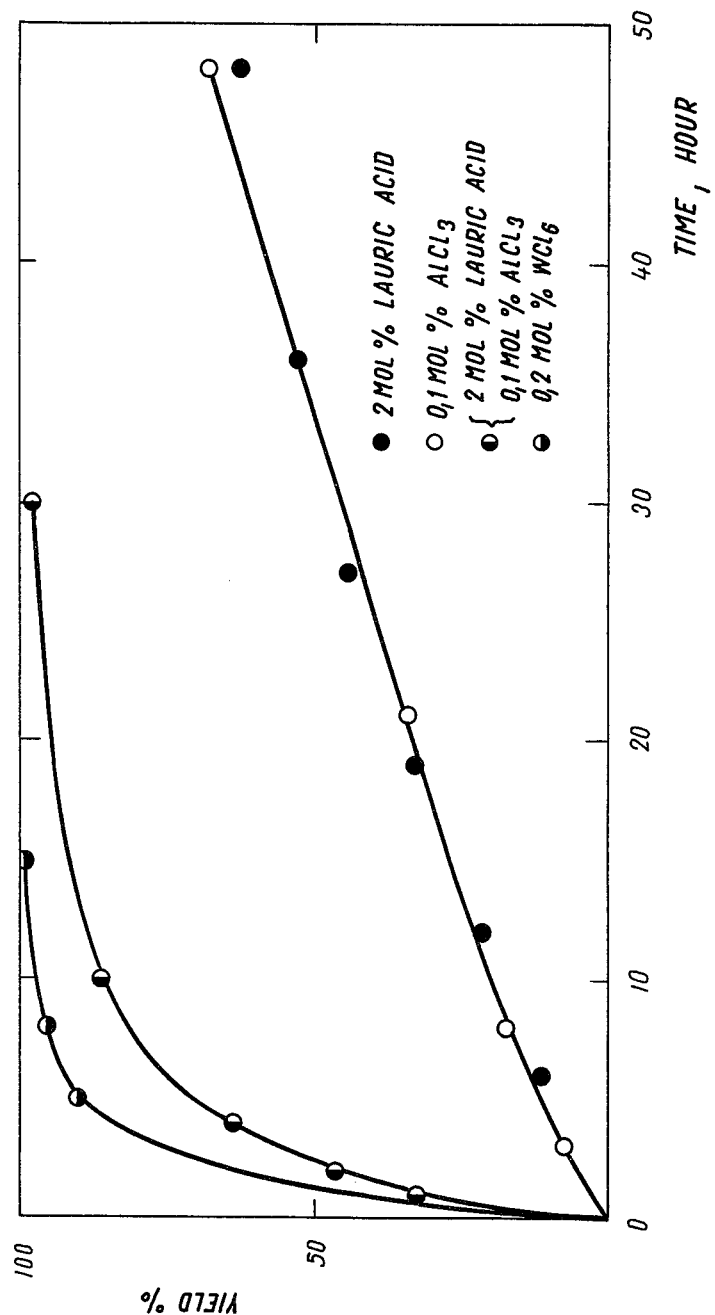

METHOD FOR THE POLYMERIZATION OF LACTAMS

CROSS-REFERENCE TO RELATED APPLICATIONS

This application is a continuation-in-part of application Ser. No. 551,515, filed Feb. 21, 1975, now abandoned.

BACKGROUND OF THE INVENTION

The invention relates to an accelerated method for the polymerization of lactams with simultaneous introduction of compounds which are able to affect the structure and properties of the resulting polyamide.

At the present time, most of the polymers of lactams are prepared by hydrolytic polymerization. Hydrolytic polymerization is usually carried out at an elevated pressure and requires high reaction temperatures and long polymerization times. Presently, processes which utilize anionic catalysts to promote polymerization have become popular. Processes which utilize anionic catalysts proceed more rapidly than hydrolytically catalyzed processes. (See U.S. Pat. No. 3,017,391.) However, the processes are very sensitive to the presence of small amounts of impurities which react with the catalyst system. The anionic polymer is somewhat less thermally stable due to the presence of residues of the strongly basic initiator. Anionic polymerization of lactams with high melting points, e.g., dodecanolactam, is technologically difficult because of the high polymerization rates achieved on mixing of the components.

A new initiation system has been sought which would overcome the shortcomings of the anionic and hydrolytic catalyzed polymerizations. The polymerization processes initiated with mineral and organic acids in an anhydrous medium have been published. (See G. M. van der Want, Ch. A. Kruisink: *J. Polymer Sci.* 35, 119/1959; T. G. Majury: *J. Polymer Sci.* 31, 383/1958.) However, carboxylic acids exhibit a smaller initiation effect than water. Strong mineral acids, such as HCl, initiate a very rapid polymerization but induce side reactions. The polymerization often stops before the polymerization equilibrium is achieved. (See S. Coubravsky, F. Geleji: *Makromol. Chem.* 105, 261/1967.) For this reason, the cationic catalysts have not yet been adopted in industrial use. The catalytic effect of Lewis acids, namely of $BF_3$ and $P_2O_5$, is mentioned in the literature (see M. Rothe: *Angew. Chem.* 80, 245/1968), but their catalytic effect requires the presence of water.

It is an object of the present invention to provide a cationic initiated polymerization process. It is a further object of the invention to provide a cationic initiated polymerization process which is carried out under substantially anhydrous conditions. Another object of the present invention is to provide a polymerization process which overcomes many of the deficiencies in the prior art processes.

BRIEF SUMMARY OF THE INVENTION

The invention is a process for polymerizing lactams having 6 to 16 carbon atoms in the lactam ring which comprises heating said lactams under substantially anhydrous non-basic conditions in the presence of from about 0.05 to 10 mol percent with respect to the lactam of an anhydrous salt of an element selected from the group consisting of Cu, Zn, B, Al, Ti, Si, V, Sb, Bi, Cr, Mo W, Mn, Fe, Co, Ni having an anion selected from the group consisting of phosphate, pyrophosphate, phosphite, sulfate, halide, carboxylate and sulfonate in the presence of from about 0.05 to 5 mol percent with respect to the lactam of an acid selected from the group consisting of pyrophosphoric, phosphorus, hydrohalic, carboxylic, sulfonic and mutants thereof.

The FIGURE illustrates the effect of the dual catalyst system of the present invention.

The coordination of the salt cation to the amide group of the lactam increases the acylation efficiency of this group and, consequently, increases the rates of the initiation and propagation reaction. The FIGURE illustrates the time dependence of the polymerization yield of dodecanolactam at 260° C. The overall polymerization rate is higher when the positive charge of the cation is higher. Higher electronegativity and concentration also increase the reaction rate. Higher acid concentration also increases the reaction rate. However, the molecular weight of the resulting polyamide decreases with the increasing concentration of both components. Therefore, it is possible to adjust the proportions of the catalytic system to provide a polymer having required properties.

The initiation system of the present invention is, for some lactams, as for example for N-substituted lactams, more effective than any of the catalyst systems known in the art. The new initiation system is more effective for use with lactams having larger numbers of carbon atoms in the ring, for instance dodecanolactam, than carboxylic acids or water which are used in a production scale.

The process of the present invention is preferably carried out under a blanket of an inert gas. Certain gases such as oxygen are known to promote degradation of polyamides. Water vapor also adversely affects the polymerization. An inert gas is intended to mean those compositions which do not substantially affect the polymerization. Gases such as nitrogen, helium, argon, carbon dioxide and the like can be utilized. Vapors which are derived from low-boiling compositions can be utilized to provide the substantially inert atmosphere. The polymerization can also be carried out in a manner in which the reaction mixture fills the reaction zone and no inert atmosphere is required.

Mixtures of two or more salts can be effectively utilized in the process. Mixtures of two or more acids are also effective.

The polymerization is preferably carried out at a temperature from about 150° to 320° C. The temperature within this range is not critical but is dependent upon the concentration of the catalyst and the properties desired in the polymer.

Generally, salts of metals from Group Ib and II to VIII of the Periodic Table can be effective. However, salts of copper, zinc, boron, aluminum, titanium, silicon, vanadium, antimony, bismuth, chromium, molybdenum, tungsten, manganese, iron, cobalt and nickel have been found to be most effective.

The anionic portion of the metal salts is preferably a phosphate, pyrophosphate, phosphite, sulfate, halide, carboxylate or sulfonate.

The preferred salts are tungsten hexachloride, antimony pentachloride, titanium tetrachloride, silicon tetrachloride, aluminum trichloride, aluminum tribromide, boron trifluoride, chromium sulfate, aluminum stearate and mixtures thereof.

The polymerization can be very rapid. The length of time for carrying out the polymerization is not critical but is dependent upon the temperature, the concentration and type of initiators, the monomer or monomers to be polymerized, and the properties required in the polymer. Reaction times from about 0.1 to 200 hours have been found to be effective.

The process of the present invention must be carried out under substantially anhydrous conditions to effect rapid polymerization. As used herein, "substantially anhydrous" is intended to mean the absence of an amount of water or compositions containing OH groups sufficient to deactivate a significant portion of the catalyst in the polymerization mixture.

The lactams which can be advantageously polymerized by the process of the present invention are lactams which contain from 6 to 16 carbon atoms and preferably 6 to 12 carbon atoms in the lactam ring. The lactams can be substituted with noninterfering substituents. The process has been found effective for polymerizing lactams such as caprolactam, capryllactam, N-methylcapryllactam, dodecanolactam, N-methyldodecanolactam, isomers of C-methylcapryllactam, pyrrolidone, laurolactam, N-methyllaurolactam and the like. The preferred lactams are caprolactam, N-methylcapryllactam, C-methylcapryllactam, dodecanolactam, N-methyldodecanolactam and mixtures thereof. The process is also effective for preparing copolymers of two or more lactams.

The polymers of the present invention can range from low molecular weight viscous liquids and tacky solids which are useful as adhesives and dispersing agents to high molecular weight rigid solids which are suitable for injection molding and extruding.

However, the added metal salts do not act as initiators only. Their presence in the polymer affects its melting temperature, crystallization kinetics and morphology in the direction of formation of fine crystalline structures. Some salts decrease the equilibrium crystallinity of the polymer and also its flammability. The halogenides, phosphates or pyrophosphates of Zn, Sb and B, if present in concentrations above 1%, can substantially affect the crystallinity and flammability of the polymer. Consequently, the resulting polyamide is softer, tougher and has a higher impact strength. Some salts, as $AlCl_3$ or $CrCl_3$, cause cross-linking of the polyamide by formation of coordination bonds between the metal cation and amide groups of the polymer or between acid end groups and cations. Such a network does not interfere with the processing of the polymer melt but favorably affects the properties of the polymer at lower temperatures.

Another advantage of the proposed catalyst systems resides in the fact that most of the applicable salts have a characteristic color and impart coloring to the resulting polyamide. Thus, the color and its intensity may be influenced by the choice of the initiator system and its concentration. For example, $CoCl_2$, $CrCl_3$, $WCl_6$, and Mn stearate impart color to the polymer. The additional effect of some colorless salts, as for example $SnCl_4$ or Zn acetate, consists in better color stability of the polyamide. Some cations introduced in this way act as stabilizers for the polyamide against thermal and photo-oxidative destruction ($CuCl_2$). The salts also suppress the tendency of the polymer to maintain an electrostatic charge.

Polyamides prepared by the above method can have a broad application as colorless and colored polymers for injection molding or extrusion. As the proposed initiator system is less sensitive to the chemical structure of fillers and other additives in comparison to anionic initiators, it may be applied in the production of polyamides and copolyamides containing fillers or also as a binding material or for coatings. The presence of salts enhances adhesion of the polymer to some materials. The presence of $CrCl_3$ or its mixture with $AlCl_3$ increases adhesion of the polyamide to non-polar rubber polymers. Polyamides containing rather large amounts of fillers which have a good polymer-to-filler adhesion can be prepared in this way. The process is useful where various mineral materials, organic and inorganic compounds and metals serve as the fillers. Especially important is the ability to prepare electrically conductive polyamides containing finely dispersed metals. The presence of metals such as Cu, Fe, or Raney Ni does not interfere with the polymerization as in the case of anionic catalized processes. The finely dispersed metal in the polymer may be achieved by direct reduction of the initiator salt with the lactam during polymerization.

If the fillers contain water or interfering reactive groups at the surface of particles (e.g., —OH groups), they must be heated to 150°–1200° C prior to polymerization. Alternatively, a compound which reacts with these groups can be added to the particles added. Advantageously mono-, di- or tri-alkylsilanes, tetraalkylsiloxanes or alkoxyaluminum compounds can be utilized.

The low molecular weight polyamides and especially copolyamides prepared with higher concentration of the initiators can be used as adhesives for leather, binders for laminating, adhesives for textiles and as dispersion agents. The polymers with higher molecular weight find application as foils for heat sealing, for instance in the lamination of various non-metallic (safety glass) and metallic materials. Also transparent foils may be prepared. The polymer is further suitable for anti-corrosive coatings which can be applied by dipping or spraying such as for vehicle parts. Abrasive foils or disks can be manufactured from the high molecular weight crystalline polyamide filled with up to 30% of powdered $Al_2O_3$, SiC or diamond. Bristles from the polyamide containing fluorides should be suitable for tooth brushes. Melt spinning of the polyamide modified by salts of the present invention shows improved features, such as better elongation without breakage. Magnesium, zinc and cobalt stearate are particularly effective.

The majority of commercial polyamides require the presence of some additives such as dyes, stabilizers, lubricants, plasticizers, fillers or fire retardants. Their incorporation into the polymer is generally carried out separately from the polymerization in expensive equipment. This invention proposes the advantageous method for polymerization with the parallel introducing of additives which may, in addition to it, act as the polymerization initiator.

The invention is further illustrated in the following examples which, however, do not represent the only possibility of its realization.

EXAMPLE 1

Lauric acid in an amount of 0.032 gram and 0.063 gram of $WCl_6$ were dissolved in 6.25 grams of dry dodecanolactam at 170° C under a nitrogen atmosphere. The mixture was heated to 260° C for 4 hours. The resulting light-blue polymer contained 1.5% of portions extractable with boiling benzene and had an intrinsic viscosity of 1.3 (tricresol, at 25°).

EXAMPLE 2

Lauric acid in an amount of 0.0285 gram and 0.0425 gram of $SbCl_5$ were dissolved in 5.6 grams of dodecanolactam at 170° C. The mixture was heated at 260° C under a nitrogen atmosphere. During heating at 260° C, metallic Sb was gradually formed and remained evenly dispersed due to the high viscosity of the medium. After 20 hours of heating, a polymer was obtained which had an intrinsic viscosity 0.7 (tricresol, 20° C) and contained 1.5% of material extractable with boiling benzene.

EXAMPLE 3 p-Toluenesulfonic acid in the amount of 0.02 gram and 0.04 gram of $Cr_2(SO_4)_3$ were dissolved in 3.1 grams of a mixture of isomers of C-methylcapryllactam at 120° C. After heating the mixture at 270° C for 5 hours under an inert atmosphere, a green colored non-crystalline polyamide was obtained.

EXAMPLE 4

Lauric acid in the amount of 0.243 gram and 0.0081 gram of $AlCl_3$ were dissolved in 12 grams of dry dodecanolactam at 165° C. The mixture was heated in an inert atmosphere at 260° C. Yield of the polymer as a function of time is plotted in the FIGURE.

EXAMPLE 5

Titanium tetrachloride in the amount of 0.077 gram containing 10% wt. of HCl was dissolved in 11.6 grams of dry molten capryllactam at 85° C. The polymer was formed after 40 minutes of heating to 260° C in an inert atmosphere. The polymer crystallized on cooling to an opaque solid block which was insoluble in m-cresol and did not contain portions extractable with benzene.

EXAMPLE 6

Zinc stearate in the amount of 0.2 gram and 0.12 gram of 2,4,6-heptanetricarboxylic acid were added to 10 grams of capryllactam dissolved in 4.71 grams of N-methylcapryllactam in a glass ampoule. The mixture was heated at 240° C for 24 hours. On cooling, a copolyamide rod with low crystallinity and high strength was obtained.

EXAMPLE 7

Benzoic acid in the amount of 0.023 gram and 0.06 gram of silicon tetrachloride were dissolved in 10 grams of dry capryllactam at 125° C. Polymers were formed by heating for 15 hours at 240° C or 25 hours at 200° C. The polymers obtained were insoluble in m-cresol and contained 1.5% of materials extractable with boiling water.

EXAMPLE 8

Dried aluminum stearate in the amount of 0.2 gram, 0.2 gram of ferric stearate and 0.033 gram of adipic acid were dissolved in 6.32 grams of capryllactam at 130° C. The mixture was heated for 20 hours at 260° C. A polyamid with a molecular weight of 4,700 was obtained in a yield of 99%.

EXAMPLE 9

Titanium tetrachloride in the amount of 0.35 gram was dissolved in a solution of 30 grams of capryllactam and 0.06 gram of 1,3,5-tricarboxybenzoic acid in 62 ml of N-methylpyrrolidone (dried over a molecular sieve). After heating at 240° C for 20 hours a viscous solution of nylon 8 (molecular weight 10,000) in N-methylpyrrolidone was obtained.

EXAMPLE 10

Adipic acid in the amount of 0.04 gram, 0.46 gram of $WCl_6$ and 0.05 gram of $SiCl_4$ were dissolved in 58 grams of dodecanolactam at 160° C. Four grams of kaolin (predried for 1 hour at 260° C in vacuum) were stirred into the solution. The mixture was heated for 3 hours at 260° C. A polymer was obtained which contained 1.4% of material extractable with boiling benzene.

EXAMPLE 11

Anhydrous p-toluene sulfonic acid in the amount of (0.155 gram) and 0.085 gram of titanium tetrachloride were dissolved in 18.8 grams of N-methyl laurolactam. The mixture was heated for 0.2 hour at 260° C under a nitrogen atmosphere. The reaction mixture contained 0.2% of monomer (from GC analysis of the polymer solution in methanol). The polymer obtained after 5 hours heating at 180° C contained 2.6% of monomer.

EXAMPLE 12

Aluminum bromide in the amount of 0.12 gram and 0.05 gram of sebacic acid were dissolved in 13 grams of dry capryllactam melt. The mixture was heated for 5 hours at 280° C. After cooling an opaque polymer was obtained.

EXAMPLE 13

Aluminum chloride in the amount of 0.1 gram and 0.12 gram of sebacic acid were dissolved in a mixture of 18 grams of laurolactam, 1.4 grams of capryllactam and 1.7 grams of caprolactam, heated under a nitrogen atmosphere at 150° C. The mixture was heated for 1.5 hours at 300° C. On cooling, a polymer with low crystallinity and high impact strength was obtained.

EXAMPLE 14

A dry melt of capryllactam containing 7 grams tungsten hexachloride and 3.6 grams of sebacic acid in 1 kg of mixture was held in a container at 90° C under a nitrogen atmosphere. The mixture was pumped by a gear-pump at a rate of 10 kg/h into a reactor heated to 265° C. It polymerized for 10 minutes and was extruded through a nozzle. The cooled polymer strip was cut into granules.

EXAMPLE 15

Dry melts of laurolactam containing 0.5% of aluminum chloride or tungsten hexachloride and 0.75% of sebacic acid were held in a container at 185° C under a nitrogen atmosphere. The melts were pumped by a gear-pump continuously into a tubular reactor heated to 300° C. The polymerization took place within 40 minutes for the mixture containing aluminum chloride and within 15 minutes for the mixture containing tungsten hexachloride. The viscous melt of polylaurolactam was, after cooling to 220°-250° C in the nozzle, extruded to form a strip of polymer which was cut to granules.

EXAMPLE 16

Boron trifluoride etherate in the amount of 0.13 ml and 0.03 gram of pyrophosphoric acid were added to 10 grams of laurolactam. After 0.3 hour heating at 300° C and cooling, a polymer containing less than 5% of low molecular weight extractables in benzene was obtained.

The examples presented herein clearly illustrate the process of the present invention. The examples show that copolymers can be formed and that mixtures of salts can be utilized in carrying out the process.

The examples also illustrate that metals having the larger positive charges (tungsten) provide a more active catalyst.

We claim:

1. A process for the cationic polymerization of lactams which comprises: heating in a substantially anhydrous system a mixture consisting essentially of at least one lactam containing from 6 to 16 carbon atoms in the lactam ring, and a catalyst consisting essentially of from about 0.05 to 10 mole percent with respect to the lactam of at least one anhydrous salt of a metal selected from the group consisting of copper, zinc, boron, aluminum, titanium, silicon, vanadium, antimony, bismuth, chromium, molybdenum, tungsten, manganese, iron, cobalt, and nickel and an anion selected from the group consisting of phosphate, pyrophosphate, phosphite, sulfate, halide, carboxylate and sulfonate, and from about 0.05 to 5 mole percent with respect to the lactam of an acid selected from the group consisting of pyrophosphoric, phosphorous, hydrohalic, carboxylic, sulfonic and mixtures thereof, to form a polyamide.

2. The process of claim 1 wherein said mixture is heated at a temperature from about 150° to 320° C.

3. The process of claim 1 wherein said lactam is selected from the group consisting of capryllactam, caprolactam, N-methylcapryllactam, C-methylcapryllactam, dodecanolactam, N-methyldodecanolactam and mixtures thereof.

4. The process of claim 1 wherein said salt is selected from the group consisting of tungsten hexachloride, antimony pentachloride, titanium tetrachloride, silicon tetrachloride, aluminum trichloride, aluminum tribromide, boron trifluoride, chromium sulfate, aluminum stearate and mixtures thereof.

5. The process of claim 1 wherein a mixture of lactams is utilized.

6. The process of claim 1 wherein said mixture further includes a solvent.

7. The process of claim 1 wherein said mixture further includes a filler.

* * * * *

UNITED STATES PATENT AND TRADEMARK OFFICE
CERTIFICATE OF CORRECTION

PATENT NO. : 4,111,869
DATED : September 5, 1978
INVENTOR(S) : Rudolf Puffr, et al.

It is certified that error appears in the above—identified patent and that said Letters Patent is hereby corrected as shown below:

In the title page, the priority data: "1749/74" should be
--1479/74--

*Signed and Sealed this*

*Eleventh* Day of *November 1980*

[SEAL]

*Attest:*

SIDNEY A. DIAMOND

*Attesting Officer*     *Commissioner of Patents and Trademarks*